United States Patent
Thuma et al.

(10) Patent No.: US 6,793,991 B2
(45) Date of Patent: Sep. 21, 2004

(54) PORTABLE IRONING PAD ASSEMBLY

(75) Inventors: Michael C. Thuma, LaGrange, IL (US); Larry Hauser, Chicago, IL (US); Carla De Young, Joliet, IL (US)

(73) Assignee: Home Products International, Chicago, IL (US)

( * ) Notice: Subject to any disclaimer, the term of this patent is extended or adjusted under 35 U.S.C. 154(b) by 7 days.

(21) Appl. No.: 10/322,047

(22) Filed: Dec. 19, 2002

(65) Prior Publication Data

US 2004/0121095 A1 Jun. 24, 2004

(51) Int. Cl.⁷ ................................................ B32B 1/02
(52) U.S. Cl. ..................... 428/34.1; 428/102; 38/140; 383/4
(58) Field of Search ........................ 428/34.1, 102; 38/140; 383/4

(56) References Cited

U.S. PATENT DOCUMENTS

| | | |
|---|---|---|
| 1,895,731 A | 1/1933 | Prenzel |
| 2,278,517 A | 4/1942 | John |
| 2,481,833 A | 9/1949 | Foster |
| 2,570,110 A | 10/1951 | Glatt |
| 2,608,749 A | 9/1952 | Obitz |
| 3,181,259 A | 5/1965 | Petrasch |
| 3,507,739 A | 4/1970 | Jacobs |
| 4,154,323 A * | 5/1979 | Sneider .......................... 383/4 |
| 4,360,984 A | 11/1982 | Ruttenberg |
| 4,621,003 A | 11/1986 | O'Kane |
| 5,161,319 A | 11/1992 | Boyd |
| 5,894,690 A | 4/1999 | Lehrman |

* cited by examiner

Primary Examiner—Alexander S. Thomas
(74) Attorney, Agent, or Firm—Wood, Phillips, Katz, Clark & Mortimer

(57) ABSTRACT

A portable ironing pad that comprises a flexible laminate structure that includes a coated cotton cover layer, a foam layer, a fiber pad layer, and a rubber mesh layer. The layers are superimposed upon one another and are secured together along the peripheral edges thereof by a stitched welting. A storage pouch is stitched to one end of the ironing pad for receipt of the folded ironing pad therein.

9 Claims, 2 Drawing Sheets

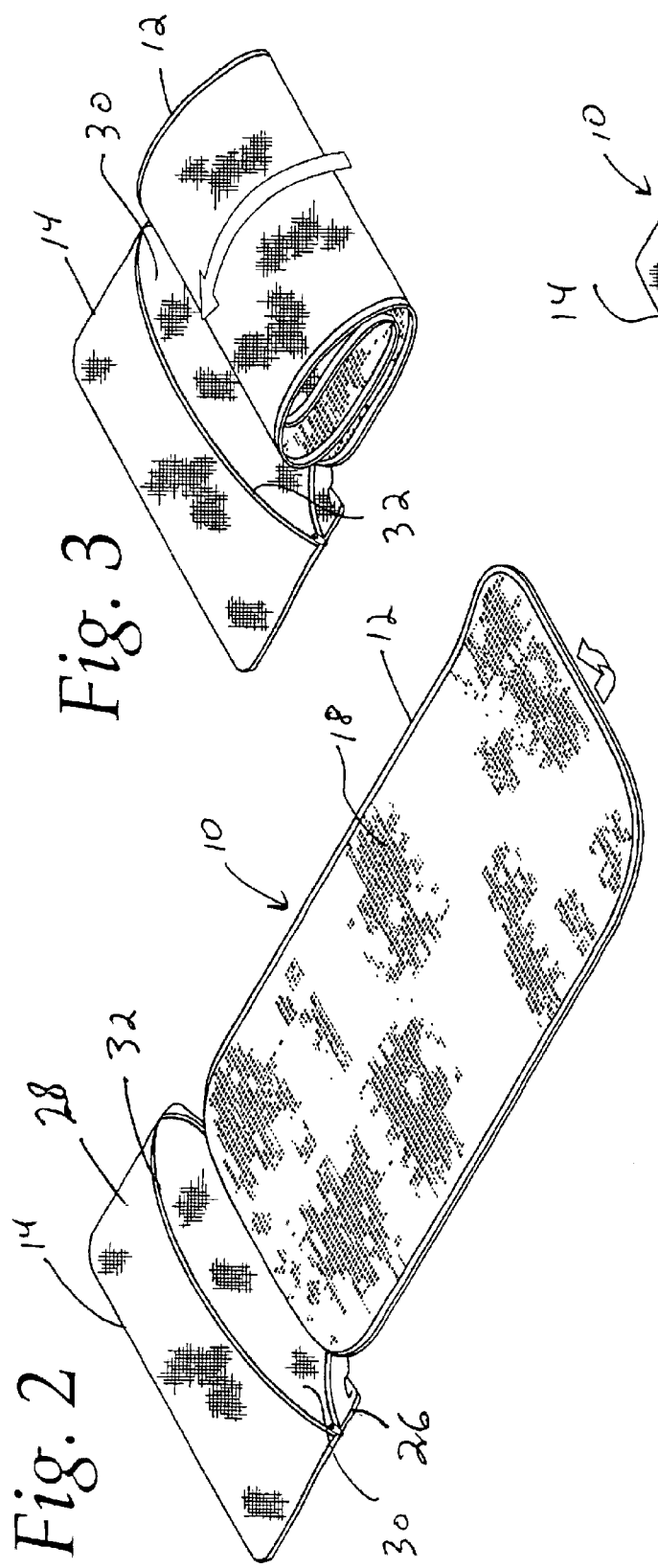

PORTABLE IRONING PAD ASSEMBLY

FIELD OF THE INVENTION

The present invention relates to portable ironing pads for use in the ironing of clothes and the like.

BACKGROUND OF THE INVENTION

It has heretofore been known to provide a flexible portable pad that is intended to serve as an ironing surface. Such pads typically comprise a laminated structure that includes an exteriorly disposed heat resistant sheets of material sandwiching a padding structure therebetween. The laminated structure and padding are secured to one another by a peripherally disposed tape and stitching securing together the components of the pad. The pad, when not in use, is capable of being rolled up and stored in a separate carrying bag having an opening sized to receive an end portion of the rolled up pad.

Examples of such portable pads are disclosed in U.S. Pat. Nos. 4,360,984 and 4,621,003.

SUMMARY OF THE INVENTION

In accordance with the present invention, a portable ironing pad is provided that comprises a flexible laminate structure that includes a coated cotton cover layer, a foam layer, a fiber pad layer, and a rubber mesh layer. The layers are superimposed upon one another and are secured together along the peripheral edges thereof by a stitched welting.

In accordance with another aspect of the invention, a storage pouch is stitched to one end of the ironing pad for receipt of the ironing pad therein. The storage pouch has an elongated opening for receipt of the folded ironing pad therein, which opening is provided with a zipper closure, or the like, to close the stored ironing pad therein.

BRIEF DESCRIPTION OF THE DRAWINGS

FIG. 2 is a perspective view of the ironing pad of FIG. 1 showing the ironing pad in a position about to be folded into its storage position;

FIG. 3 is a perspective view of the ironing pad of FIG. 2 showing the ironing pad in a folded condition ready for placement in the storage pouch; and FIG. 4 is a perspective view of the ironing pad of FIG. 3 showing the ironing pad in a stored condition within the storage pouch.

DESCRIPTION OF PREFERRED EMBODIMENTS

Figure 1:
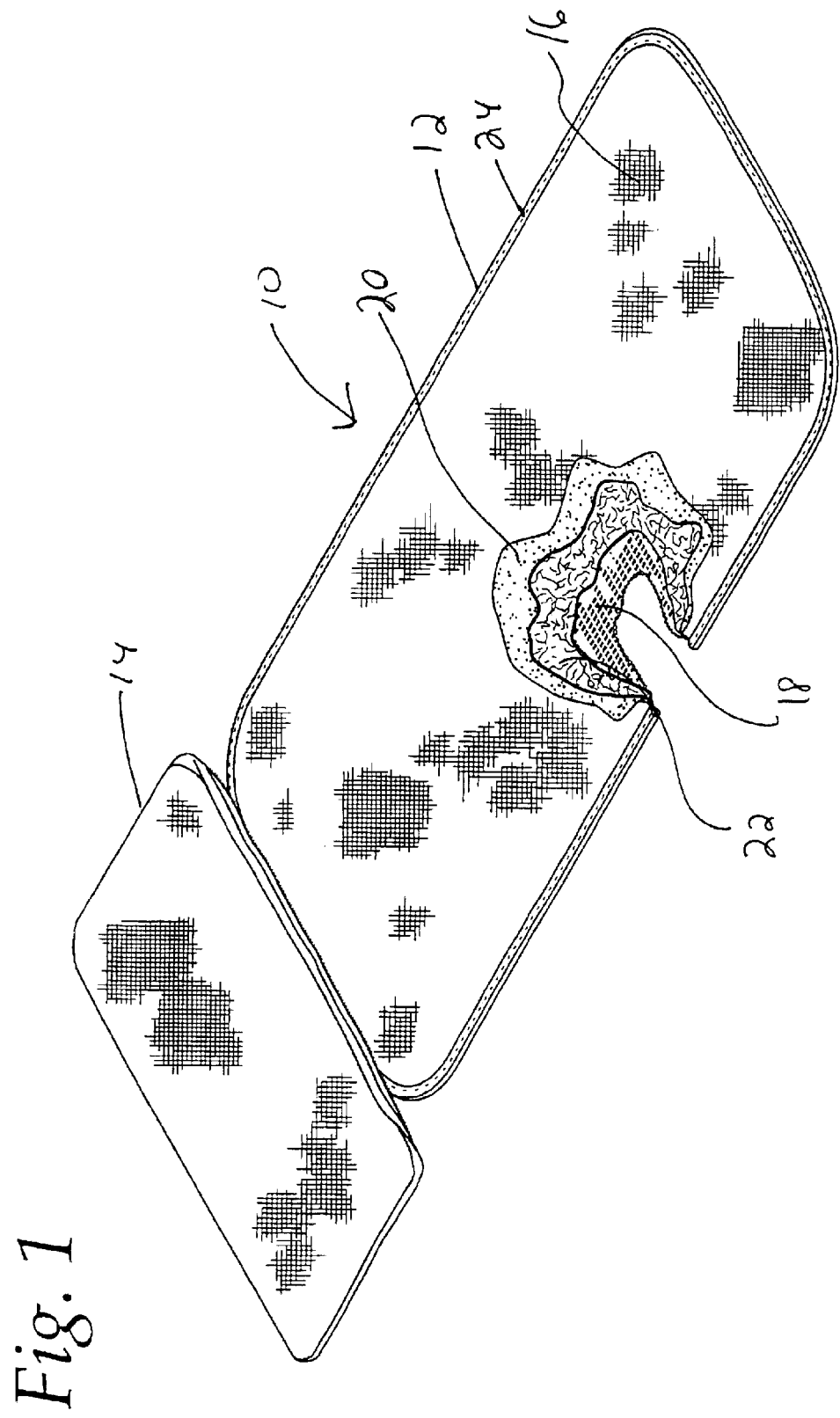
FIG. 1 is a perspective view of a portable ironing pad in accordance with the invention, a portion of which being broken away to show the laminated layers.

Referring to the drawings, wherein like reference numbers indicate like or corresponding parts, and referring particularly to FIG. 1, there is shown a flexible, pliable portable ironing pad assembly of the type intended to be carried by and used by travelers, or used in confined areas, or the like.

An ironing pad assembly constructed in accordance with the present invention is indicated generally by the reference numeral 10. Ironing pad assembly 10 includes an ironing pad portion 12 and a storage pouch portion 14.

Referring to FIG. 1, ironing pad portion 12 comprising a plurality of superimposed layers that are secured together adjacent the outer peripheries thereof. In accordance with a preferred embodiment, pad portion 12 includes a top cover layer 16, a bottom rubber mesh layer 18, a layer of foam material 20, and a layer of fibers 22. The foam material layer 20 is preferably adjacent the top cover layer 16 and the fiber pad layer 22 is preferably adjacent the bottom rubber mesh layer 18.

In accordance with preferred embodiment of the invention, top cover layer 16 is 50–60 square 100% cotton fabric; rubber mesh layer 18 is a polyethylene mesh; foam layer 20 is 3/16" polyurethane foam; and fiber pad layer 22 is a 3/16" pad of 40% cotton fibers/60% synthetic fibers, a felt pad or a synthetic fiber pad. The top cover layer 16 is preferably scorch coated with pearlescent, titanium scorch shield, silicone and/or stain guard.

The peripheral edges of the layers 16, 18, 20, and 22 are secured together in a well known manner by a stitched welting or bias tape 24.

Storage pouch portion 14 comprises a front side portion 26 and a rear side portion 28. A transverse opening 30 is formed in the rear side portion 28, which opening is closed by a zipper 32. Opening 30 may be closed by other well-known means such as Velcro®, securing straps, or the like. One of the edges of the ironing pad portion 12 is suitably secured to the inner surface of the front side portion 26 by stitching or the like, a short distance from the opening 30.

Referring to FIGS. 1–4, the operation of ironing pad assembly 10 will now be discussed. In use, ironing pad assembly 10 is in the position as shown in FIG.1 and would typically be located on a flat horizontal surface. Upon completion of the ironing task, the ironing pad assembly 10 is turned over and the ironing pad portion 12 is folded as depicted in FIGS. 2 and 3. The folded ironing pad portion 12 is then inserted through opening 30 into the storage pouch portion 12 and the zipper 32 is moved into its closed position.

Thus, the instant invention has been shown and described in what is considered to be a preferred embodiment, however, it is recognized that departures may be made therefrom within the spirit and scope of this invention, which is therefore not to be limited except by the claims set forth hereinafter.

What is claimed is:

1. A portable ironing pad assembly to be carried by and used by travelers, said ironing pad assembly comprising:

an ironing pad including a top cover layer made from heat resistant material and a bottom rubber mesh layer that are superimposed adjacent one another and secured together at least adjacent the peripheral edges thereof; and a storage pouch attached to said ironing pad adjacent a portion of the peripheral edge thereof, said storage pouch having an opening through which said ironing pad may be folded upon itself and received within said storage pouch.

2. A portable ironing pad assembly as in claim 1, wherein said storage pouch is provided with a closure for selectively closing said opening.

3. A portable ironing pad assembly as in claim 2, wherein said closure is a zipper closure.

4. A portable ironing pad assembly as in claim 1, wherein said ironing pad includes a layer of foam material adjacent said top cover layer.

5. A portable ironing pad assembly as in claim 1, wherein said ironing pad further includes a layer of fibers adjacent said bottom rubber mesh layer.

6. A portable ironing pad assembly as in claim 1, wherein said ironing pad is of a generally rectangular configuration having a pair of end portions and a pair of side portions, said end portions having a length dimension that is no greater than one half the length dimension of said side portions.

7. A portable ironing pad assembly as in claim 6, wherein said storage pouch is attached to one of said end portions of said ironing pad.

8. A portable ironing pad assembly as in claim 1, wherein said ironing pad layers are secured together by a stitched welting extending along the peripheral edges thereof.

9. A portable ironing pad assembly as in claim 8, wherein said storage pouch is stitched to said welting.

* * * * *